May 31, 1960     R. I. MASON     2,938,483
ACOUSTIC DECOY
Filed Nov. 29, 1945

Inventor
RUSSELL I. MASON

By M. O. Hayes

Attorney

United States Patent Office 2,938,483
Patented May 31, 1960

2,938,483
ACOUSTIC DECOY

Russell I. Mason, Waterford, Conn., assignor to the United States of America as represented by the Secretary of the Navy Filed Nov. 29, 1945, Ser. No. 631,751

4 Claims. (Cl. 114—20)

This invention relates in general to decoys and more particularly to a submarine, under attack, launching a decoy or lure to attract the enemy attackers and allow the submarine to escape.

Recent tests on underwater loudspeakers have shown that speech can be transmitted through the water between four and five miles. This discovery makes it possible to build a decoy that will operate successfully for the purpose specified. Upon launching it from a submarine that is attempting to escape destruction when under depth or aerial bomb attack, the decoy emits sound similar to the submarine, of such character and intensity as to attract the pursuers away from the real submarine.

The loudspeakers, above mentioned, have in addition to their relative high efficiency, certain inherent advantages of design that invite its use in a decoy. Inasmuch as the radiating surface or diaphragm of such underwater loudspeakers is a cylinder which can be made in convenient diameters and lengths, its shape lends itself to being a portion of the body of a torpedo, which carries the necessary propelling and electronic equipment partially within the body of the loudspeaker cylinder. Such loudspeakers are known to those skilled in the art and may be of the type taught in Patent No. 2,190,666 issued to F. W. Kallmeyer on February 20, 1940.

It is an object of this invention to provide a decoy for a submarine.

Another object is to provide a decoy for a submarine in the form of a torpedo that may be released when the submarine is under attack.

Another object is to provide the torpedo decoy with a sound radiating and a propelling device to simulate the water noise and doppler effect of a submarine.

Another object is to provide the topedo decoy with a hydrophone in order to receive and broadcast an echo, if the decoy enters a sound ranging and detecting beam.

Another object is to provide the torpedo decoy with a phonograph and record of the water noise of the submarine wherein the record is broadcast simulating the submarine after the decoy has left the vicinity of the submarine under attack.

Another object is to provide a torpedo like decoy for a submarine that is capable of imparting approximately 2.5 watts of acoustic output energy to the water.

Another object is the provision of a decoy for a submarine which will be economical to manufacture, reliable in operation and which possesses all of the qualities of ruggedness and dependability in service.

Figure 1:
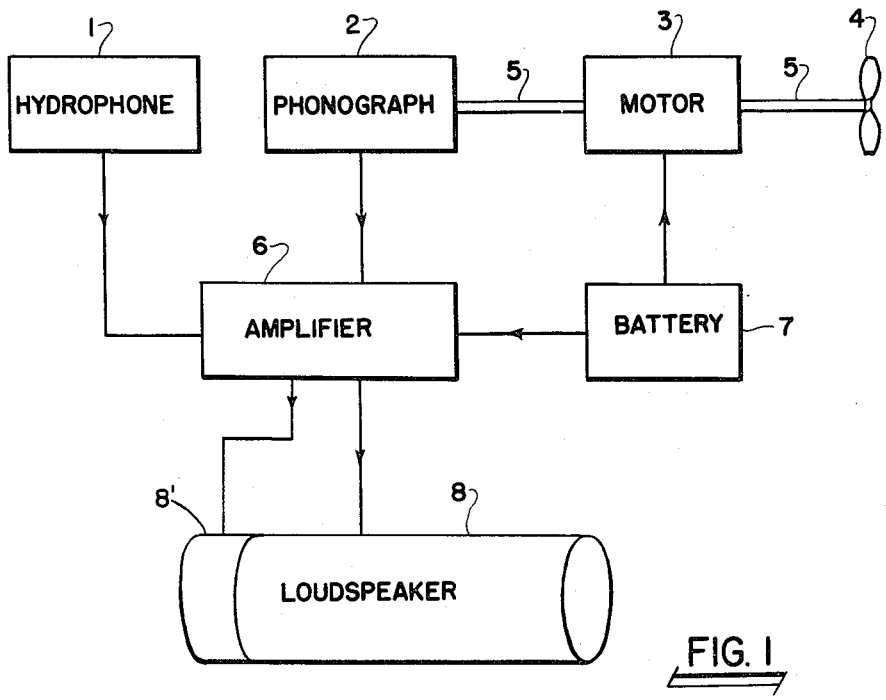
Figure 1 is a partial block diagram of the apparatus illustrating the various component parts, and particularly the radiating diaphragm of the loudspeaker.
Figure 2:
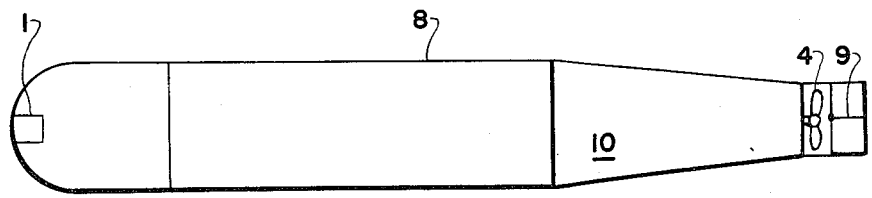
Figure 2 illustrates the decoy torpedo and the relation of the loudspeaker diaphragm thereto.

Referring to Figure 1 the decoy torpedo is comprised of storage battery 7 furnishing motive power to drive the device through electric motor 3 turning propeller 4 through shaft 5. The battery 7 may also furnish power for amplifier 6, though not necessarily so, because separate dry batteries may be used such as are employed in portable radio receivers. The propelling motor 3 may drive the phonograph 2 through shaft 5, if a separate motor is not used for driving the phonograph. The phonograph 2 is preferably of the small, repeating, high fidelity, steel tape record type, though any other kind will serve as well. The output of the phonograph is supplied to amplifier 6 for amplification before transmittal to loudspeaker 8 for radiation to the water. Supersonic hydrophone 1 is employed to pick up echo ranging impulses and to feed them through an isolation channel not shown, to amplifier 6 for rebroadcasting over an additional small supersonic radiator 8' used for this purpose. Loudspeaker 8 serves as the cylindrical outer housing for the apparatus which would be enclosed in a watertight inner case. The supersonic hydrophone 1 may be mounted in the streamline nose of the decoy or any other suitable location.

Small electric outboard motors are available that drive rowboats from three to five miles per hour for several hours on storage battery power. This speed is approximately the speed of a submarine when submerged. And it is obvious that these motors will drive a decoy torpedo at approximately the speed of a submerged submarine. By having the decoy moving in this manner, its speed enables the decoy to simulate the doppler effect of a moving submarine.

The phonograph record is preferably made of steel and of the loop or endless type. The actual noise of a submarine is recorded thereon by varying the magnetic flux in the steel tape. This type of record is rugged and it is easily driven by the same motor that propels the device. Obviously, any type of record may be used that furnishes the required input to the amplifier.

Amplifier 6 may be a battery powered class B amplifier, such a device being economical to operate and may be made as small in size as it is possible to make any suitable amplifier. Assuming that the loudspeaker is 5% efficient, a 50 watt class B amplifier will give 2.5 watts acoustic output in the water which has been shown by test to be far more than the acoustic output of a real submarine. Obviously, such an acoustic output will monopolize the enemy's attention.

The controls of the decoy torpedo are not critical, it must be kept running and remain submerged. It must not turn and return near the mother submarine. It would not matter if it wandered within reasonable limits up and down, consequently simple hydrostatic pressure actuated elevators will suffice. If such elevators are used the decoy is made barely buoyant, and it is kept submerged by the elevators. Or it may be made barely heavy, so as to maintain its correct depth only when moving and thus sinking when batteries have expired, affording security. A trailing wire or rudder control will keep the device on an acceptably straight course.

In operation, the submarine under attack would release the decoy at an appropriate time. The controls of said decoy are set so that it would travel some distance from the submarine before turning on its loudspeaker. The acoustic power of the decoy is such that the enemy detecting devices would immediately focus on it, and the submarine would minimize its own noise to create the maximum deception. It is understood that the decoy is broadcasting screw and water noises from a record that was made from actual submarine noises or its equivalent. If the enemy is using echo ranging and detecting equipment, the decoy, through its supersonic hydrophone 1 picks up the pulse and sends out a very strong echo for the enemy's attention. Since the decoy is moving with approximately the speed of a submerged submarine, it

What is claimed is:

1. A submarine decoy having the form of a torpedo and adapted to be released by a submarine comprising an elongated casing, power means within said casing to propel said casing, said casing having a portion of its cylindrical part forming a radiating means, record means for simulating the noises of a submerged submarine and electronic means within said casing connected to said record means to energize said radiating means, whereby acoustical energy is emitted from said radiating means to resemble the water noises of a submarine.

2. In an underwater acoustical decoy the combination comprising an elongated casing to be released from a submarine, power means within said housing to propel said casing, a portion of said casing forming a radiating means, record means on which is recorded the water noises of a submerged submarine, and electronic means for energizing said radiating means, said record means being arranged to initiate said electronic means whereby said radiating means emits acoustical energy resembling the recorded water noises.

3. In an acoustical decoy the combination comprising an elongated casing to be released from a submarine, means for propelling said casing, a portion of said casing forming a radiating means, record means on which is recorded the water noises of a submerged submarine, means for receiving echo ranging impulses, and electronic means for energizing said radiating means, said record means and said receiving means being arranged to initiate the electronic means whereby said radiating means emits acoustical energy to reproduce the recorded water noises and the received echo ranging impulses.

4. In an acoustical decoy the combination comprising an elongated casing to be released from a submarine, a source of energy, means connected to said source of energy for propelling asid casing, a portion of said casing arranged to function as a radiating means, record means on which is recorded the water noises of a submerged submarine, means for receiving echo ranging impulses, and amplifying means connected to the source of energy and to the radiating means for energizing the latter, the output of said record means and said receiving means being connected to the input of the amplifying means whereby said amplifying means energizes said radiating means to emit acoustical energy to reproduce the recorded water noises and the received echo ranging impulses.

References Cited in the file of this patent
UNITED STATES PATENTS

| | | |
|---|---|---|
| 1,464,103 | Nash | Aug. 7, 1923 |
| 1,872,946 | Hecht | Aug. 23, 1932 |
| 2,016,907 | Rice | Oct. 8, 1935 |
| 2,017,695 | Hahnemann | Oct. 15, 1935 |
| 2,209,157 | Glunt | July 23, 1940 |
| 2,373,313 | Jeandron | Apr. 10, 1945 |
| 2,375,004 | Knowles | May 1, 1945 |
| 2,395,862 | Freeman et al. | Mar. 5, 1946 |
| 2,397,107 | Hammond | Mar. 26, 1946 |
| 2,710,458 | Reed | June 14, 1955 |

OTHER REFERENCES 20,000 Leagues Under The Sea. Verne. The Spencer Press, 1937. Library number PZ 3 V594, T.W. 22, hereafter referred to as Nautilis. The pages concerned are 26, 27, 42, 56, 57, 58, 103, 186, 245, 247, 253, 254.